(12) United States Patent
Vineyard

(10) Patent No.: US 7,509,854 B2
(45) Date of Patent: Mar. 31, 2009

(54) PRECISION MEASUREMENT OF GAS VELOCITY AND VOLUMETRIC FLOW RATE

(75) Inventor: Carl Vineyard, Wellington, OH (US)

(73) Assignee: Grace Consulting, Inc., Wellington, OH (US)

( * ) Notice: Subject to any disclaimer, the term of this patent is extended or adjusted under 35 U.S.C. 154(b) by 0 days.

(21) Appl. No.: 11/788,310

(22) Filed: Apr. 19, 2007

(65) Prior Publication Data

US 2008/0257034 A1    Oct. 23, 2008

(51) Int. Cl.
*G01F 15/14* (2006.01)
(52) U.S. Cl. .................................................. 73/201
(58) Field of Classification Search ........................ None
See application file for complete search history.

(56) References Cited

U.S. PATENT DOCUMENTS

| | | | | |
|---|---|---|---|---|
| 3,977,249 A | * | 8/1976 | Wittig | 73/861.67 |
| 4,074,554 A | * | 2/1978 | Summerlin | 72/114 |
| 4,166,386 A | * | 9/1979 | Warrick et al. | 73/861.01 |
| 4,344,768 A | * | 8/1982 | Parker et al. | 436/43 |
| 4,596,470 A | * | 6/1986 | Park | 374/14 |
| 5,394,759 A | | 3/1995 | Traina | |
| 5,891,157 A | * | 4/1999 | Day et al. | 606/130 |
| 2002/0059033 A1 | | 5/2002 | Batug et al. | |

* cited by examiner

*Primary Examiner*—Harshad Patel
(74) *Attorney, Agent, or Firm*—Tarolli, Sundheim, Covell & Tummino LLP

(57) ABSTRACT

Systems and methods are provided for precise measurement of volumetric flow within an emissions source. A general rotation element is rotatable by an operator relative to the emissions source about an axis. A precision rotation element is rotatable by an operator relative to the general rotation element from a first position ninety degrees about the axis to a second position. A conduit receives a probe. The conduit is rotatable with the precision rotation element about the axis.

19 Claims, 4 Drawing Sheets

PRECISION MEASUREMENT OF GAS VELOCITY AND VOLUMETRIC FLOW RATE

TECHNICAL FIELD

The present invention relates generally to the field of environment testing, and more particularly to systems, apparatuses, and methods for precisely calculating the velocity and/or volumetric flow rate within an emissions source.

BACKGROUND OF THE INVENTION

In the field of environment testing, a number of standardized methodologies for the determination of volumetric flow from an emissions source are codified in 40 CFR 60, Appendix A. One methodology, referred to as Method 2G, utilizes a 2-D probe, defined as a directional probe that measures velocity pressure and the yaw angle of gas flow, or a 3-D probe, which also measures a pitch angle of the flow, within the emissions source to determine the volume of emissions through the source. Small errors in the determination of the yaw angle in either direction can generally cause an overestimation of the volumetric flow through the emissions source. Since the determined volumetric flow is used over a reasonably long period of time (e.g., several months to a year) to estimate the emitted mass of a given substance at the emissions source, small errors in the flow determination can result in significant overestimation of the emitted mass over that period. Owners of power plants and other emissions sources must purchase credits for the amount of each pollutant they emit, making an overestimation of emitted pollutants a significant, unnecessary expense.

SUMMARY OF THE INVENTION

In accordance with an aspect of the present invention, an apparatus is provided for precise measurement of volumetric flow within an emissions source. A general rotation element is rotatable by an operator relative to the emissions source about an axis. A precision rotation element is rotatable by an operator relative to the general rotation element from a first position ninety degrees about the axis to a second position. A conduit receives a probe. The conduit is rotatable with the precision rotation element about the axis.

In accordance with another aspect of the present invention, a method is provided for precise measurement of volumetric flow within an emissions source. A probe is inserted into an aperture associated with a first rotation mechanism and a second rotation mechanism. The first rotation mechanism is manually rotated around an axis such that the probe is placed at a first position. The first rotation mechanism is mechanically secured as to prevent further rotation. The second rotation mechanism is manually rotated relative to the first rotation element as to rotate the probe ninety degrees around the axis from the first position to a second position.

In accordance with yet another aspect of the present invention, an apparatus is provided for precise measurement of volumetric flow within an emissions source. A rotating element is operative to rotate about an axis relative to the emissions source. A first locking element is operative to engage at least a portion of the rotation element as to prevent rotation of the rotation element relative to the emissions source. A conduit, configured for receiving a probe, is operative to rotate about the axis relative to the rotation element from a first position to a second position ninety degrees from the first position. A second locking element is operative to selectively couple the conduit to the rotation element as to arrest rotation of the conduit relative to the rotation element.

DETAILED DESCRIPTION OF INVENTION

Figure 1:
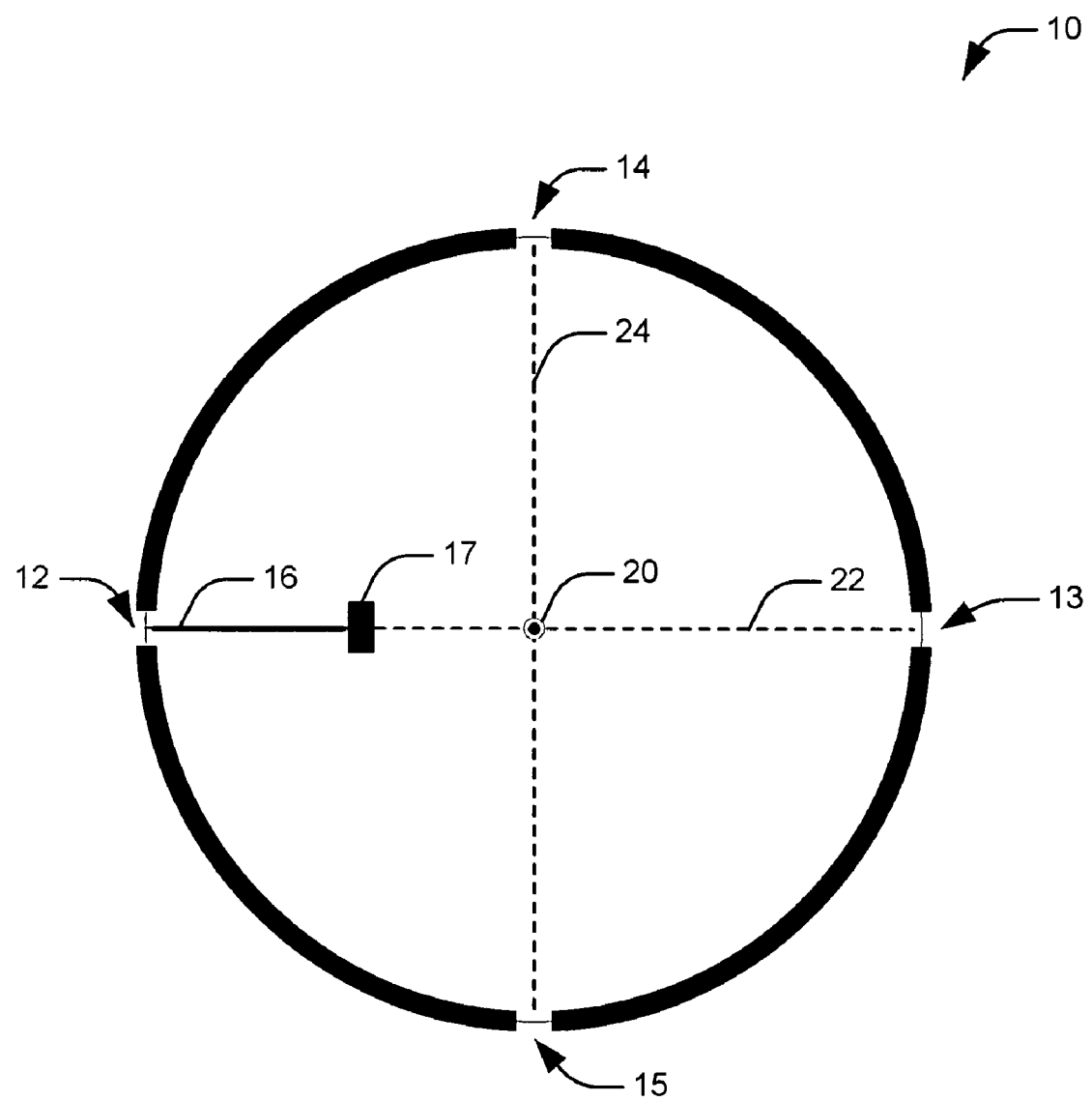
FIG. 1 is a schematic illustration depicting an exemplary emission source in accordance with an aspect of the present invention.

FIG. 1 illustrates a cross sectional view of an exemplary emissions source 10, such as a stack, in accordance with an aspect of the present invention. The emissions source 10 comprises four testing ports 12-15 that allow for a probe 16 to be inserted into the interior of the emission source. It will be appreciated that, in typical or general practice, all four testing ports 12-15 will be utilized sequentially, in conducting emissions testing. For the purposes of this discussion, a first testing port 12 will be illustrated as receiving the probe 16, including a flow measurement component 17 on the end of the probe, and the various axes within the emissions source will be defined relative to this port. A stack axis 20 runs longitudinally through the center of the emissions source 10 perpendicular to the plane encompassing the four ports. A pitch axis 22 is defined as an axis perpendicular to the stack axis 20 and extending from a second port 13 opposite the origin of the probe (e.g., the first port) through the center of the emissions source. A yaw axis 24 is defined as an axis, running between the remaining ports 14 and 15, that is perpendicular to the stack axis and the pitch axis. Accordingly, from the perspective of a tester testing a vertical stack, the stack axis would be vertical, the yaw axis would run horizontally left and right, and the pitch axis would run forward through the center of port to the center of the stack.

A pitch angle for an emissions flow is defined as the angle between a pitch component of the flow velocity (e.g., a projection of the flow velocity into a plane defined by the stack axis 20 and the pitch axis 22) and the stack axis 20. The yaw angle is the angle between a yaw component of the flow velocity (e.g., a projection of the flow velocity into a plane defined by the stack axis 20 and the yaw axis 24) and the stack axis 20. To determine the yaw angle for a given emissions flow, the probe 16 is rotated around the pitch axis 22 until a position of zero flow through the probe is obtained, such that the differential pressure on both ends of the probe is zero. It will be appreciated that since the probe 16 runs along the pitch axis 22, this rotation will take place within a plane parallel to the plane defined by the yaw and stack axes 24 and 20, and the condition of zero differential pressure will be referred to herein as a "yaw null." At this position, a flow measurement component 17 on the probe 16 should be perpendicular to the yaw component of the flow. Once a yaw null has been achieved, the flow measurement component 17 can be rotated ninety degrees to the yaw angle to align with the yaw component of the flow to obtain a flow measurement. This measurement can then be repeated at each ports 13-15 to obtain a reliable result.

Figure 2:
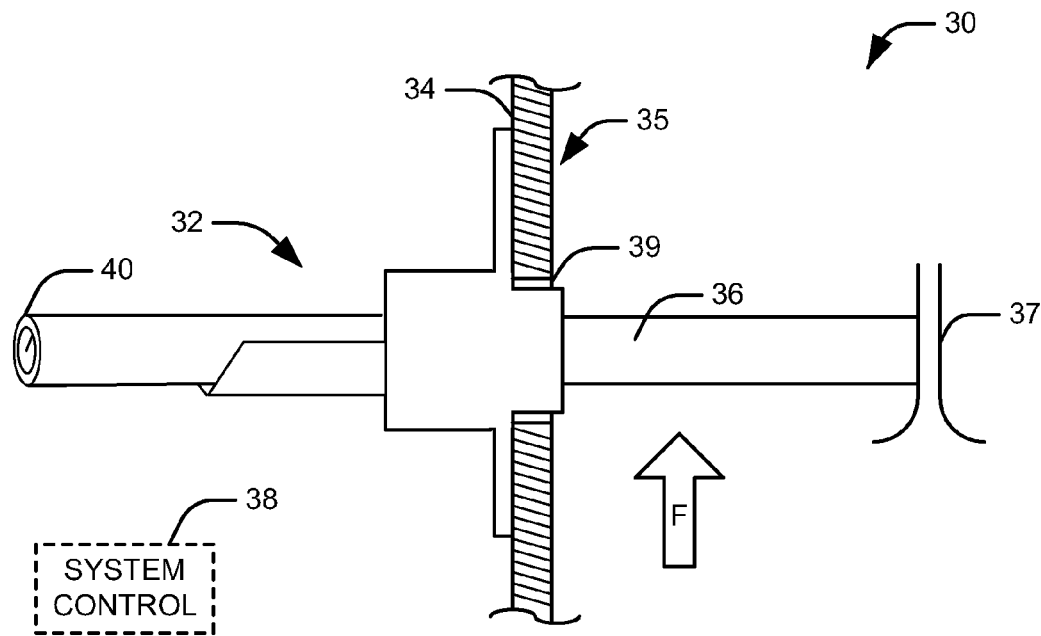
FIG. 2 illustrates an exemplary testing arrangement in accordance with an aspect of the present invention

FIG. 2 illustrates an exemplary testing arrangement 30 in accordance with an aspect of the present invention. A precision measurement apparatus 32 in accordance with an aspect of the invention can be mounted to a structure 34 such as a sidewall of an emissions source 35, such as a smoke stack, vent, or duct, so as to extend through a port 39 in the sidewall. The apparatus 32 includes a probe 36 having one or more velocity sensors 37, for example, appropriately mounted pitot tubes for measuring the velocity of flow, indicated generally at F within the emissions source 35. The probe 36 can also include a nozzle (not shown) for collecting a sample of gas within the emissions source. Data from one or more velocity sensors can be passed along the length of the probe to a system control 38, as indicated generally by dashed lines in FIG. 2.

To facilitate measuring of the flow velocity of emissions within the emissions source 35, the precision measurement apparatus 32 is configured to allow the probe 36 to be rotated relative to the emissions source. For example, the apparatus can include one or more rotation mechanisms that allow an operator to shift the rotational position of the probe. During testing, the probe is rotated to a position in which its velocity sensors are perpendicular to the direction of flow within the tube. This can be determined at the system control 38 as position in which the flow velocity reaches a null value. Once this position is achieved, an operator can read a yaw null angle for the measurement from a digital or analog protractor 40 on the appropriate end of the probe. In accordance with an aspect of the present invention, a precision rotation mechanism associated with the probe can then be used to turn the probe exactly ninety degrees, as to align the velocity sensors 37 with the direction of flow. At this point, a flow velocity measurement can be taken and a sample of the emitted gas can be captured.

The determined flow velocity can be used, along with the known measurements of the emissions source, to determine a volumetric flow rate of gas from the emissions source. The gas sample can be analyzed to determine the concentration of one or more substances of interest within the gas. From these values, it is possible to estimate the amount of each substance of interest that will be emitted from the emission source over a given time period.

Figure 3:
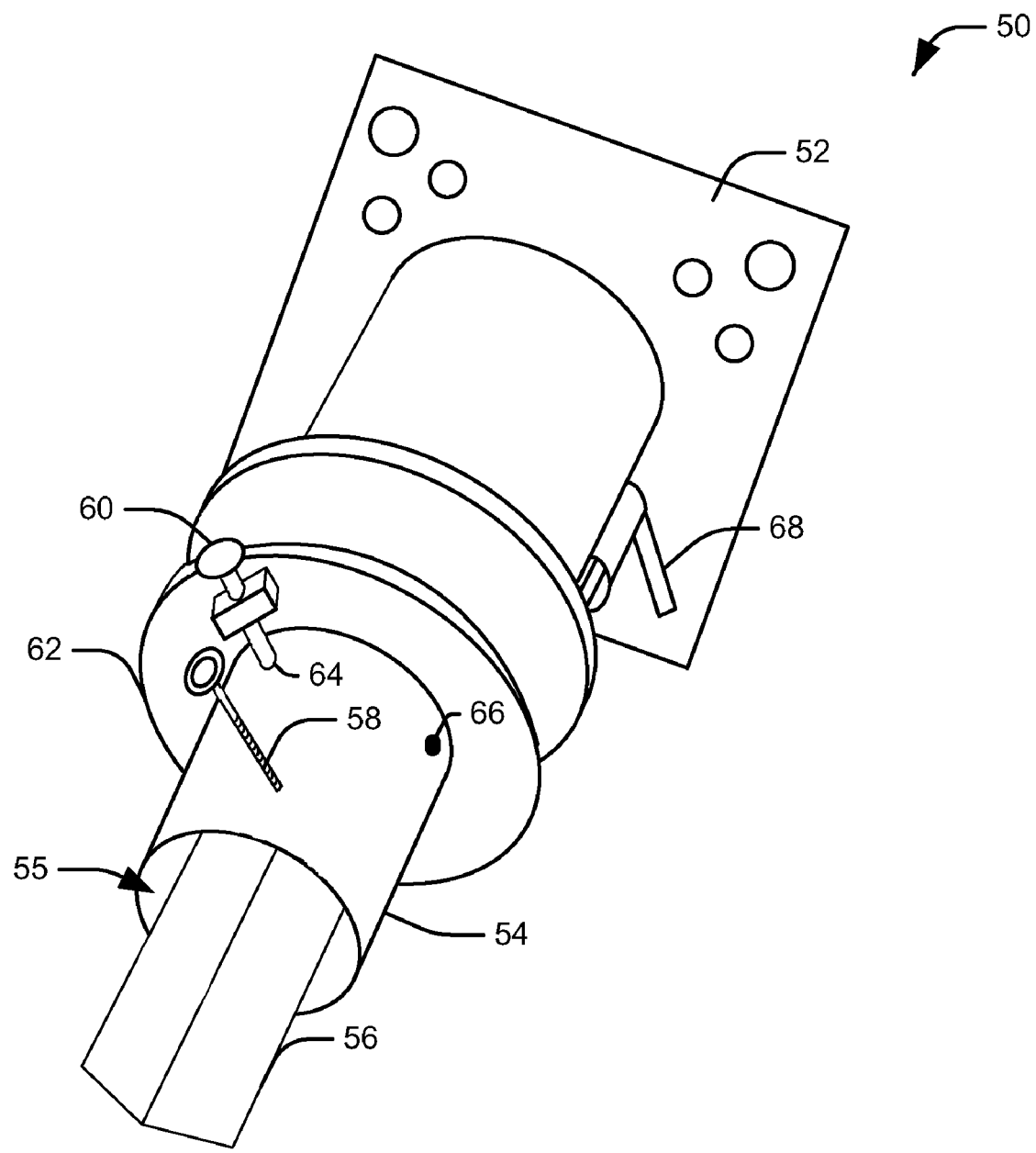
FIG. 3 is a perspective illustration depicting a first exemplary implementation of a precision flow measurement apparatus in accordance with an aspect of the present invention.

FIG. 3 illustrates a first exemplary implementation of a precision flow measurement apparatus 50 in accordance with an aspect of the present invention. The illustrated apparatus 50 includes a mounting plate 52 containing at least one aperture for receiving a screw, bolt, or other connector. A rotating conduit 54 that passes longitudinally through the apparatus and the mounting plate 52 is operative to rotate relative to the mounting plate 52. The rotating conduit 54 contains an aperture 55 that is sized to receive a testing probe. It will be appreciate that the rotating conduit 54 and the aperture can be of any suitable shape for receiving a probe. A rigid support member 56 extends from the rotating conduit 54 opposite the mounting plate 52. The support member 56 can be configured to an appropriate shape to securely receive and support a portion of the length of a testing probe. In the illustrated implementation, the support member is configured to receive a square probe, which allows for a simplified alignment of the probe.

A mounting element 58 is located at the rotating conduit for securing the probe within the conduit, such that the rotational and axial position of the probe relative to the conduit is maintained. In the illustrated implementation, the mounting element 58 is a screw arrangement, but it will be appreciated that other mechanical and non-mechanical mechanisms (e.g., magnetic attraction, adhesives, etc.) can be used for securing the probe within the conduit. A retaining pin 60 mounted on a rotating flange 62 can be inserted into a first slot 64 on the rotation conduit to mechanically secure the rotating conduit in a first position relative to the rotating flange, such that the rotating flange 62 and the conduit 54 rotate as a unit relative to the mounting plate 52. The retaining pin 60 is also configured to mechanically engage a second slot 66 on the conduit to mechanically secure the rotating conduit 54 in a second position relative to the flange 62. In accordance with an aspect of the present invention, the first position and the second position are separated by ninety degrees of rotation of the rotating conduit 54.

The rotation of the rotating flange 62 can be arrested via a locking mechanism 68 to secure the flange in position relative to the mounting plate 52. In the illustrated example, the locking mechanism 68 comprises a piston arrangement that can be manipulated via an associated lever as to mechanically engage the flange 62. It will be appreciated, however, that other mechanical and non-mechanical mechanisms (e.g., switchable electromagnets, etc.) can be used to arrest the rotation of the flange 62.

During operation, the mounting plate 52 is mechanically secured to a port in an emission source via a mounting plate 52 to minimize motion of the apparatus relative to the emission source. A testing probe is then inserted into the conduit 54 and secured in place via the mounting element 58. Once the probe is secured, the rotating conduit 54 can be rotated relative to the mounting board to rotate the probe. When a yaw null is achieved, the locking mechanism 68 is engaged to arrest rotation of the flange 62. Engaging the locking mechanism 68 prevents the flange 62 and the conduit 54 from rotating, maintaining the probe at the yaw null and allowing an accurate measurement of the yaw null angle to be made. The retaining pin 60 is then lifted to allow rotation of the rotating conduit relative to both the flange 62 and the mounting plate 52. The position of the second slot 66 represents ninety degrees relative to the first slot 64, such that the rotation conduit is positioned to allow the retaining pin 60 to be inserted into the second slot 66, the conduit, and thus the probe, has been rotated precisely ninety degrees relative to the from its position when the retaining pin 60 was positioned in the first slot 64. Accordingly, the probe is now aligned parallel with the flow of gas within the emission sources, and accurate flow velocity measurements can be taken.

Figure 4:
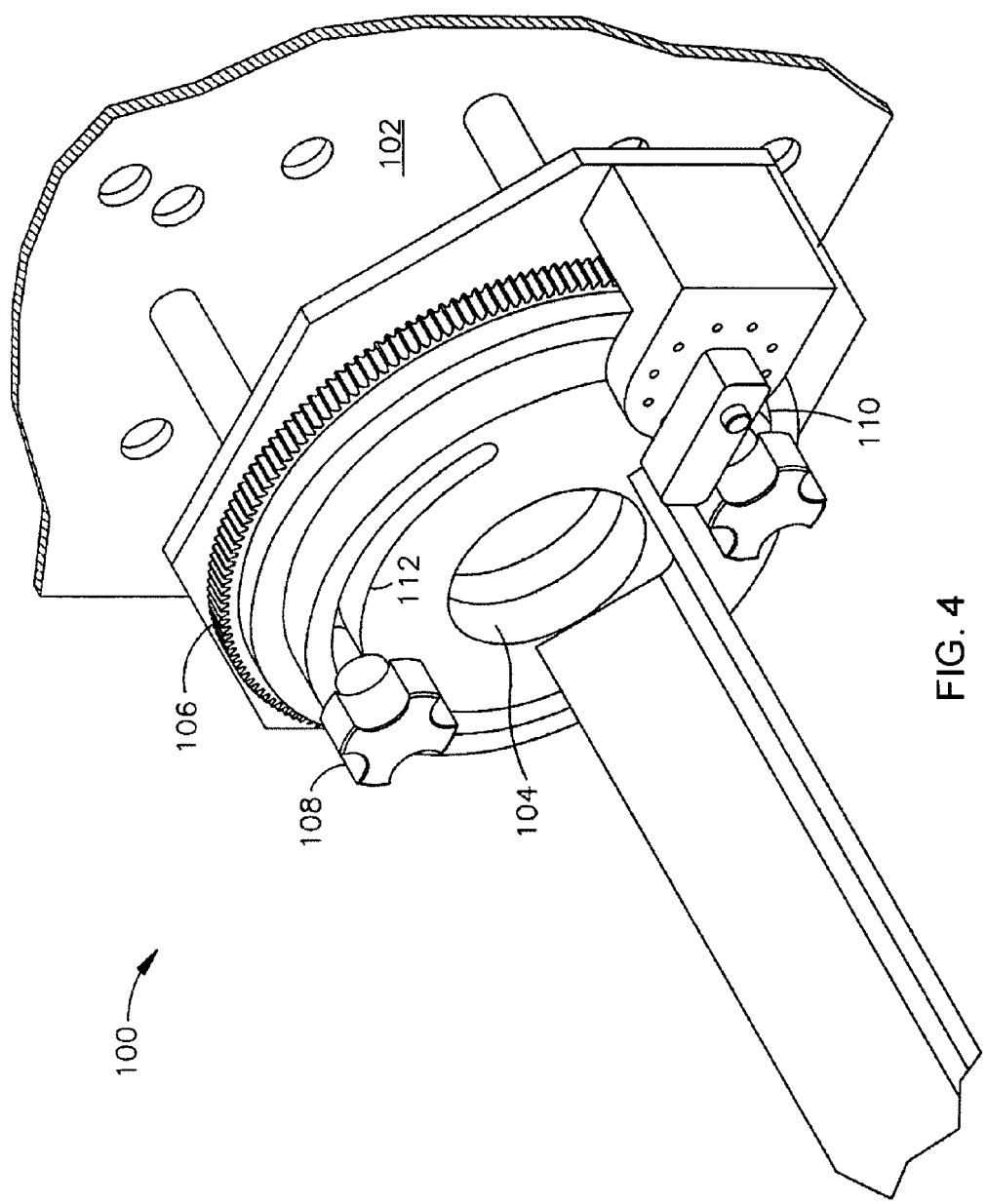
FIG. 4 is a perspective illustration depicting a second exemplary implementation of a precision flow measurement apparatus in accordance with an aspect of the present invention.

FIG. 4 illustrates a second exemplary implementation of a precision flow measurement apparatus 100 in accordance with an aspect of the present invention. The apparatus 100 includes a mounting plate 102 that allows the apparatus to be mounted to a port in the emissions source as to minimize motion of the apparatus relative to the emission source. A conduit 104 includes an aperture that extends through the mounting plate 102 such that a probe can be inserted through the conduit into the emission source. The conduit 104 is mechanically coupled to a rotating plate 106 having gear teeth on its outer circumference by a shaft 108 that mechanically engages the plate. For example, the shaft 108 can extend through an aperture in the plate, screw into a threaded hole in the plate, or frictionally engage the plate as to maintain a common rotational orientation between the conduit 104 and the plate 106. Each of these gear teeth represent a known angular position for the plate, and accordingly, the conduit and the probe.

The rotating plate 106 can engage with a second gear (not shown) that can be manually rotated by an operator using an associated knob 110. Accordingly, an operator can quickly and accurately move the rotating plate 106 and the conduit 104 to a desired position, and the gear teeth on the rotating plate engage with the second gear as to arrest further rotation of the plate once the desired position has been achieved. The conduit 104 can be uncoupled from the rotating plate 106 by lifting, turning, or otherwise mechanically manipulating the shaft 108, allowing the conduit 104 to rotate independently of the rotating plate 106. In accordance with an aspect of the present invention, the independent rotation of the conduit 104 is limited to ninety degrees by placing the shaft 108 within a groove 112 that circumscribes ninety degrees of arc around the conduit. Accordingly, by shifting the position of the shaft 108 from a first terminal position of the groove 112 to a second terminal position of the groove, a rotation of precisely ninety degrees can be achieved.

Figure 5:
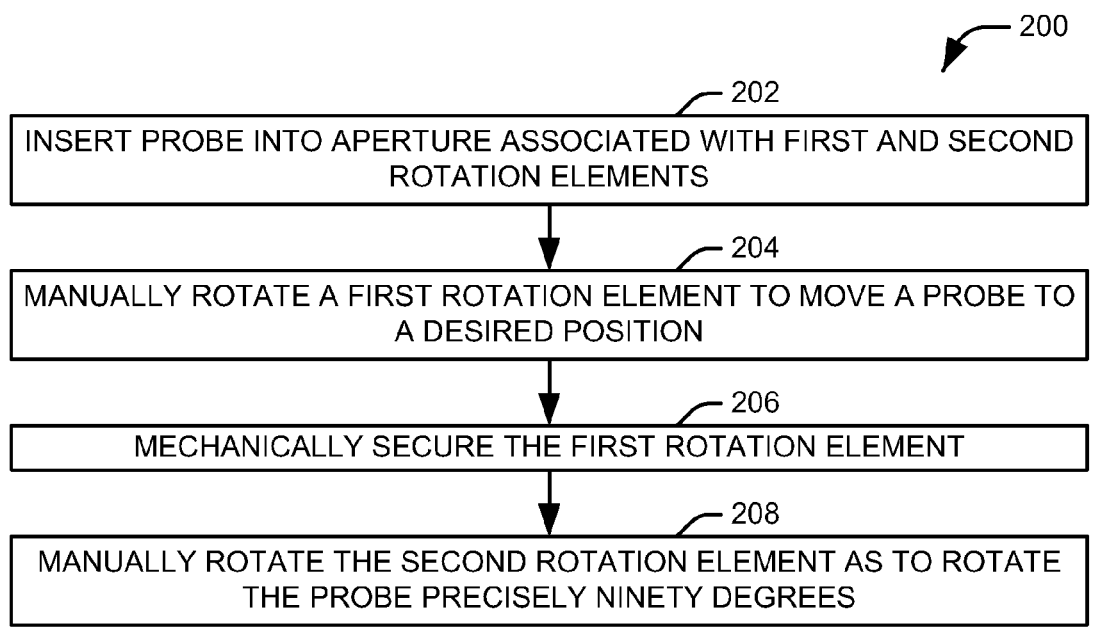
FIG. 5 illustrates a method for precisely measuring volumetric flow within an emissions source in accordance with an aspect of the present invention.

In view of the foregoing structural and functional features described above, methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a method 200 for precisely measuring volumetric flow within an emissions source in accordance with an aspect of the present invention. The method begins at 202 where a probe in inserted into an aperture associated with a first rotation mechanism and a second rotation mechanism. It will be appreciated that the aperture can extend to a port associated with the emissions source such that the probe extends into the emissions source. At 204, the first rotation element is rotated as to move the probe at a desired position, for example, a yaw null position. It will be appreciated that the first rotation element can be selectively coupled to the second rotation mechanism such that the second rotation element rotates in concert with the first rotation element.

At 206, the first rotation element is mechanically secured as to arrest its rotation. For example, the first rotation element can be mechanically secured by a piston that can be manipulated as to engage the first rotation element or a gear or similar component engaged with the first rotation element can be held stationary. At 208, the second rotation element can be rotated to provide a precise ninety degree rotation to the probe. For example, the second rotation element can comprise a groove or slot arrangement that allows the second rotation element to be decoupled from the first rotation element and to be rotated exactly ninety degrees.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. An apparatus for measurement of volumetric flow within an emissions source comprising:

a general rotation element, adapted for rotation by an operator about an axis, the general rotation element comprising an aperture configured to receive a probe for selective insertion into the emission source, such that a rotation of the general rotation element around the axis produces a corresponding rotation of the probe, the probe being configured to measure the volumetric flow within the emissions source; and a precision rotation element, selectively coupled to the general rotation element and comprising the aperture, such that a rotation of the general rotation element around the axis produces a rotation of the probe, the precision rotation element being configured to be manually rotatable relative to the general rotation element between a first position and a second position separated from the first position by ninety degrees about the axis.

2. The apparatus of claim 1, the precision rotation element comprising first and second slots sized to receive a retaining pin, the first and second slots being positioned ninety degrees from each other.

3. The apparatus of claim 2, wherein the retaining pin is mounted to the general rotation element such that, when engaged, the retaining pin secures the precision rotation element to the general rotation element such that the precision rotation element rotates with the general rotation element.

4. The apparatus of claim 1, the precision rotation element comprising a movable shaft, constrained by a groove that encompasses ninety degrees of arc, such that by shifting the shaft from a first terminal position within the groove to a second terminal position within the groove rotates the probe by ninety degrees.

5. The apparatus of claim 1, further comprising a locking element that is operative to engage at least a portion of the general rotation element as to prevent rotation of the general rotation element.

6. The apparatus of claim 5, wherein the locking mechanism comprises a piston that can be extended to mechanically engage the general rotation element.

7. The apparatus of claim 1, the general rotation element comprising:

a first gear configured such that each of a plurality of positions associated with the gear corresponds to a known angle of rotation for the probe a second gear, operable to be rotated by an operator, that mechanically engages the first gear such that the first gear can be rotated to a desired position.

8. The apparatus of claim 1, further comprising a mounting plate that can be mechanically secured to a port in the exterior surface of the emissions source as to minimize motion of the apparatus relative to the emissions source.

9. The apparatus of claim 1, further comprising a securing mechanism that maintains the position of the probe relative to each of the general rotation element and the precision rotation element.

10. A testing system for estimating an output of at least one substance from an emissions source, comprising:

the apparatus of claim 1;

a probe comprising at least one sensor for determining flow velocity of gases within the emissions source and a nozzle for collecting a sample from the emissions source, the probe being configured for insertion into the aperture; and a system control that estimates the output of the at least one substance from the determined flow velocity and the collected sample.

11. A method for measurement of volumetric flow within an emissions source comprising:

inserting a probe into the emissions source through an aperture shared by a first rotation mechanism and a second rotation mechanism;

manually rotating the first rotation mechanism, the second rotation mechanism, and the probe around an axis such that the probe is placed at a first position;

mechanically securing the first rotation mechanism as to prevent further rotation;

manually rotating the second rotation mechanism relative to the first rotation element as to rotate the probe ninety degrees around the axis from the first position to a second; and measuring the volumetric flow with the probe.

12. The method of claim 11, wherein manually rotating the second rotation mechanism comprises:

disengaging a retaining pin that mechanically couples the first rotation mechanism to the second rotation mechanism from a first slot;

rotating the second rotation mechanism relative to the first rotation mechanism such that the retaining pin is aligned with a second slot; and engaging the retaining pin into the second slot.

13. The method of claim 11, wherein manually rotating the first rotation mechanism around an axis comprises rotating the first rotation mechanism until a flow sensor associated with the probe is normal to the flow within the emissions source, and manually rotating the second rotation mechanism comprising rotating the flow sensor to a position parallel to the flow.

14. The method of claim 11, wherein manually rotating the second rotation mechanism comprises shifting a movable shaft from a first terminal position to a second terminal position within a groove encompassing ninety degrees of arc.

15. The method of claim 11, wherein mechanically securing the first rotation mechanism comprises manipulating a piston to mechanically engage the first rotation mechanism.

16. The method of claim 11, wherein rotating the first rotation mechanism comprises manually turning a first gear that engages a second gear mechanically coupled with the first rotation mechanism.

17. An apparatus for measurement of volumetric flow within an emissions source comprising:

a first rotation element operative to rotate about an axis relative to the emissions source, the first rotation element comprising an aperture for receiving a probe as to allow the probe to be inserted into the emission source, such that a rotation of the first rotation element around the axis produces a corresponding rotation of the probe, the probe being adapted to measure the volumetric flow within the emissions source;

a first locking element that is operative to engage at least a portion of the first rotation element as to prevent rotation of the first rotation element relative to the emissions source;

a second rotation element, mechanically connected to the first rotation element and comprising the aperture for receiving a probe, such that a rotation of the second rotation element produces a rotation of the probe, the second rotation element being operative to rotate about the axis relative to the first rotation element between a first position and a second position ninety degrees from the first position; and a second locking element operative to selectively couple the second rotation element to the first rotation element as to arrest rotation of the conduit relative to the first rotation element.

18. The apparatus of claim 17, further comprising a mounting plate that can be mechanically secured to a port in the exterior surface of the emissions source as to minimize motion of the apparatus relative to the emissions source.

19. The apparatus of claim 17, the second locking element comprising:

a retaining pin mounted to the first rotation element;

a first slot on the second rotation element that is operative to receive the retaining pin, such that the second rotation element rotates with the first rotation element when the retaining pin is engaged; and a second slot on the second rotation element, the first slot and the second slot being separated by ninety degrees around the axis.

* * * * *